(12) United States Patent
Rouyer et al.

(10) Patent No.: US 9,393,710 B2
(45) Date of Patent: Jul. 19, 2016

(54) STORAGE MECHANISM FOR NESTING CUTTING TOOLS AND A HOUSEHOLD ELECTRICAL APPLIANCE CONTAINING SUCH A MECHANISM

(75) Inventors: Philippe Rouyer, Juillan (FR); Jean-Marie Lafond, Ibos (FR); Nicolas Suberbie, Juillan (FR)

(73) Assignee: SEB S.A., Ecully (FR)

( * ) Notice: Subject to any disclaimer, the term of this patent is extended or adjusted under 35 U.S.C. 154(b) by 624 days.

(21) Appl. No.: 13/877,795

(22) PCT Filed: Sep. 29, 2011

(86) PCT No.: PCT/FR2011/052281
§ 371 (c)(1),
(2), (4) Date: Jun. 25, 2013

(87) PCT Pub. No.: WO2012/045961
PCT Pub. Date: Apr. 12, 2012

(65) Prior Publication Data
US 2013/0263716 A1    Oct. 10, 2013

(30) Foreign Application Priority Data
Oct. 7, 2010    (FR) ...................................... 10 58157

(51) Int. Cl.
*B02C 18/16*    (2006.01)
*B26D 7/00*    (2006.01)
*A47J 43/25*    (2006.01)

(52) U.S. Cl.
CPC ................. *B26D 7/00* (2013.01); *A47J 43/255* (2013.01); *B02C 18/16* (2013.01); *Y10T 83/929* (2015.04)

(58) Field of Classification Search
CPC ....... B26D 7/00; A47J 43/255; Y10T 83/929; B02C 18/16; B02C 18/141
USPC ......................................... 241/93, 101.2, 291
See application file for complete search history.

(56) References Cited

U.S. PATENT DOCUMENTS 4,081,145 A    3/1978    Moe et al.

FOREIGN PATENT DOCUMENTS

EP    2159014 A1    3/2010

*Primary Examiner* — Mark Rosenbaum
(74) *Attorney, Agent, or Firm* — The Webb Law Firm (57) ABSTRACT

A mechanism for storing nesting cutting tools includes a hood to house and at least partially cover at least some of the cutting tools nested within one another. The hood includes locking mechanisms on a household electrical appliance for preparing food. The mechanism includes a securing ring for cutting tools nested in the hood, with the locking mechanisms for the hood designed to come into contact with additional locking mechanisms of the securing ring which also contain at least one locking stop for the nested cutting tools relative to the ring which holds the tools at least partially inside the hood.

24 Claims, 6 Drawing Sheets

STORAGE MECHANISM FOR NESTING CUTTING TOOLS AND A HOUSEHOLD ELECTRICAL APPLIANCE CONTAINING SUCH A MECHANISM

BACKGROUND OF THE INVENTION

1. Field of the Invention

This invention concerns the technical field of household electrical cooking appliances containing cutting tools in a geometric form which allows them to be nested.

This invention concerns, in particular, a mechanism for storing cutting tools shaped like a truncated cone.

2. Description of Related Art

Document EP 2 159 014 shows a household electrical cooking appliance containing a motorized base housing an electrical motor, an accessory with a storage compartment for cutting tools shaped to allow them to nest, as well as a locking hood for cutting tools stacked within one another in the storage compartment; said hood contains a locking mechanism on the accessory. This arrangement allows the cutting tools to be stored on the appliance when the appliance is not in use. However, when the appliance is being used with one of the cutting tools, the unused cutting tools are simply placed in the locking hood and may be overturned by a simple hand movement.

Therefore, it would be worthwhile, for reasons of practicality and safety when using cutting tools and the household electrical appliance to have a mechanism for storing the tools nested within one another which would not suffer from the inconvenience of the single locking hood proposed in EP 2 159 014.

One goal of this invention is to meet this requirement and improve the storage of cutting tools which have a geometric form which allows them to nest.

SUMMARY OF THE INVENTION

This goal is achieved in accordance with the invention using a storage mechanism for nesting cutting tools, with a hood which can store and cover at least some of said cutting tools nested within one another; the hood contains a locking mechanism for a household electrical cooking appliance. This mechanism has a securing ring to secure the cutting tools nested in the hood, a mechanism to block the hood which is designed to connect with the additional locking mechanism of said ring, which also contains at least one locking stop for said nested cutting tools against said ring which at least partially secures said tools within the hood.

Accordingly, the unused cutting tools which remain nested within one another within the hood are secured within it by the securing ring in the event said hood is moved.

Preferably, in accordance with the invention, the securing ring contains a ring-shaped body on the external wall of which are said additional hood locking mechanisms and on the internal wall of which is at least one locking stop for the cutting tools.

Preferably, the locking mechanisms of the locking hood on the securing ring are selected from among one of the following categories: clipping locking mechanisms, screwed locking mechanisms or socketed locking mechanisms.

Preferably again, in accordance with the invention, the locking mechanisms of the storage mechanism ring of the invention include at least one continuous fold on the external wall of the ring or multiple protruding sections uniformly distributed along the external wall.

In accordance with a special embodiment of the invention, the storage mechanism ring also contains of attachment elements on the household electrical cooking appliance. These attachment elements allow the storage mechanism to be attached to the household electrical appliance with which the cutting tools are used, which facilitates storage of the entire unit when it is not in use. In particular, the ring attachment elements may be configured to allow the storage mechanism to be hooked to an accessory of the household electrical appliance such as a storage compartment for the cutting tools similar to the locking hood described in EP 2 159 014.

In one embodiment, the locking hood of the storage mechanism is preferably shaped to fit the contours of the cutting tools nested within one another; preferably said tools are identical in size.

A second goal of the invention also concerns a household electrical cooking appliance with a motorized base consisting of a case housing an electrical motor and electrical controls for said motor, an accessory which is part of the motorized base which contains a storage compartment for the cutting tools, a set of said cutting tools shaped to enable them to be nested within one another, as well as in the accessory storage compartment, connecting and rotating mechanisms for the cutting tool mounted within the accessory storage compartment and a locking hood for said cutting tools stacked within one another in the accessory storage compartment. In an innovative manner, this appliance also contains a storage mechanism for the nesting cutting tools as previously described which consists at least the locking hood attached to the securing ring for the cutting tools nested within one another.

In a more preferable embodiment, the securing ring storage mechanism contains mechanisms to attach the storage mechanism to the household electrical cooking appliance, in particular on the appliance's accessory.

Such attachment mechanisms may, in particular, be hooks, or use sockets or screws, or even function through elastic deformation and clipping on the accessory, for example.

Various other characteristics based on the description below refer to the attached drawings which show, as non-exhaustive examples, various methods in which to achieve the goals of the invention.

DETAILED DESCRIPTION OF THE INVENTION

Figure 1:
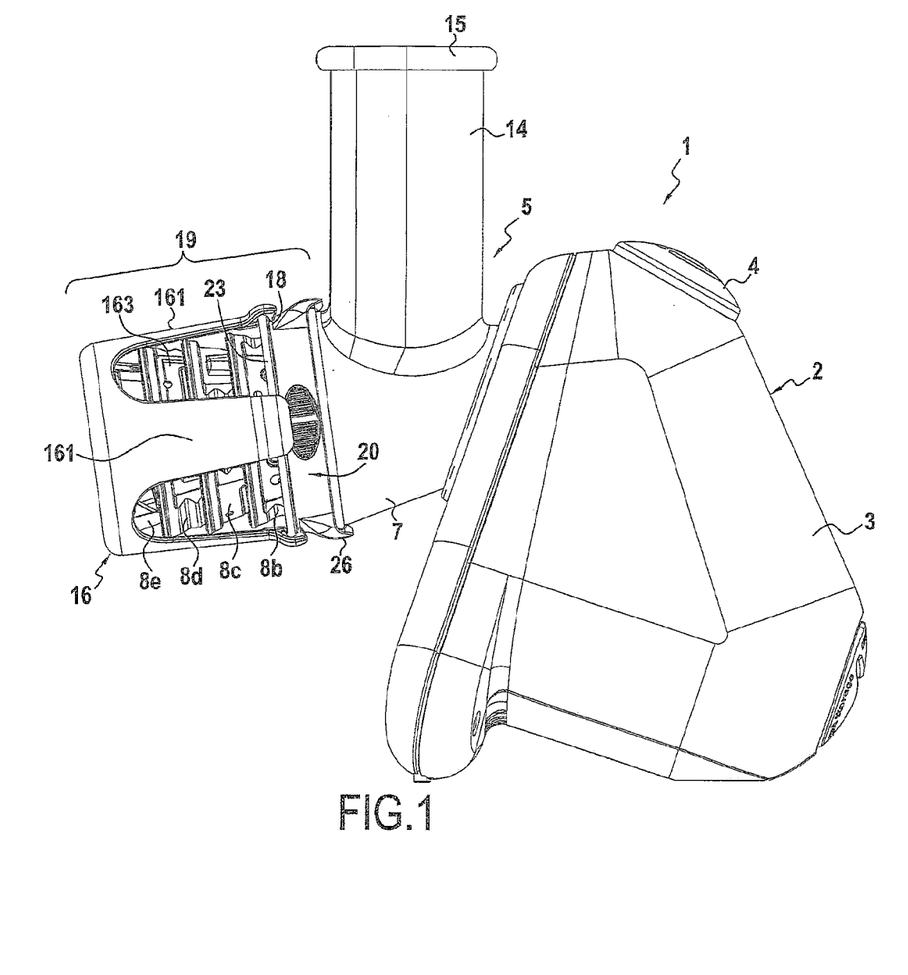
FIG. 1 shows a household electrical cooking appliance and a storage mechanism for a set of cutting tools shown in a side view of the invention.

FIG. 1 shows household electrical appliance 1 in accordance with this invention. Household electrical appliance 1 consists of motorized base 2, including case 3, enclosing an electrical motor and the electronic control circuits for the motor (not shown) connected to control elements, such as switches 4 located on case 3, to allow appliance 1 to be started and stopped by a user.

Figure 2:
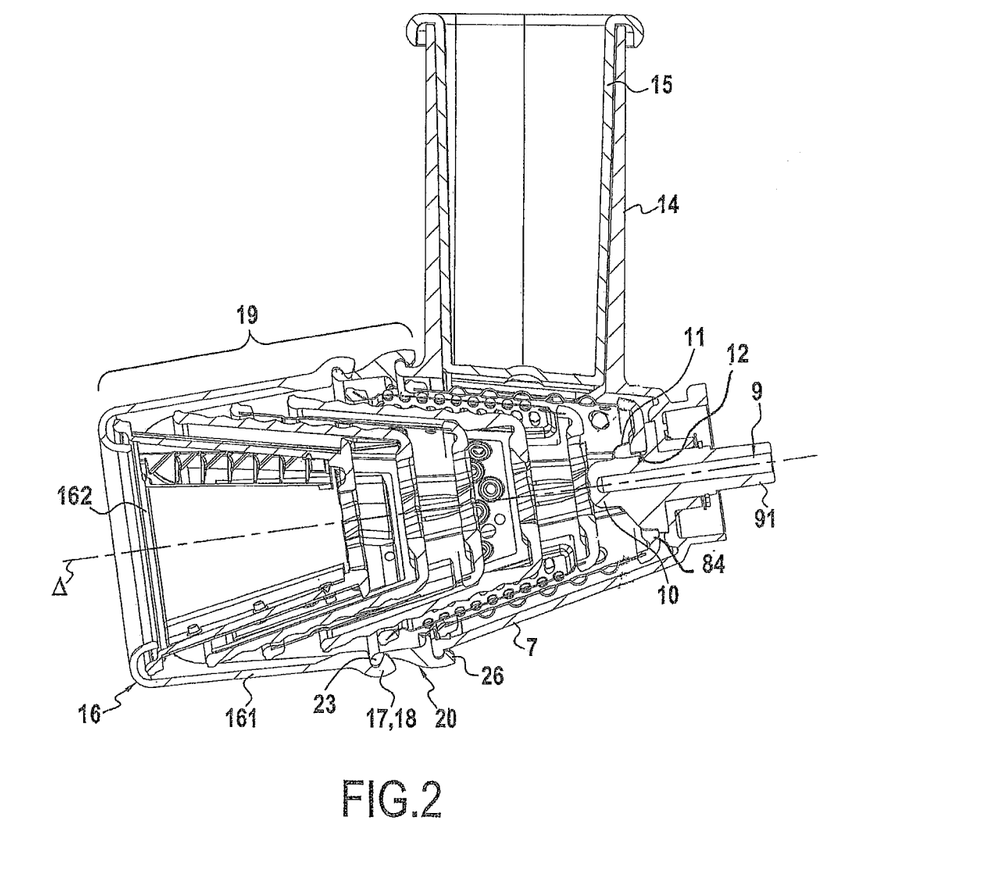
FIG. 2 shows a longitudinal view of FIG. 1, limited to showing the household electrical appliance accessory working with the storage mechanism of the invention and a set of cutting tools stored in said mechanism.
Figure 3:
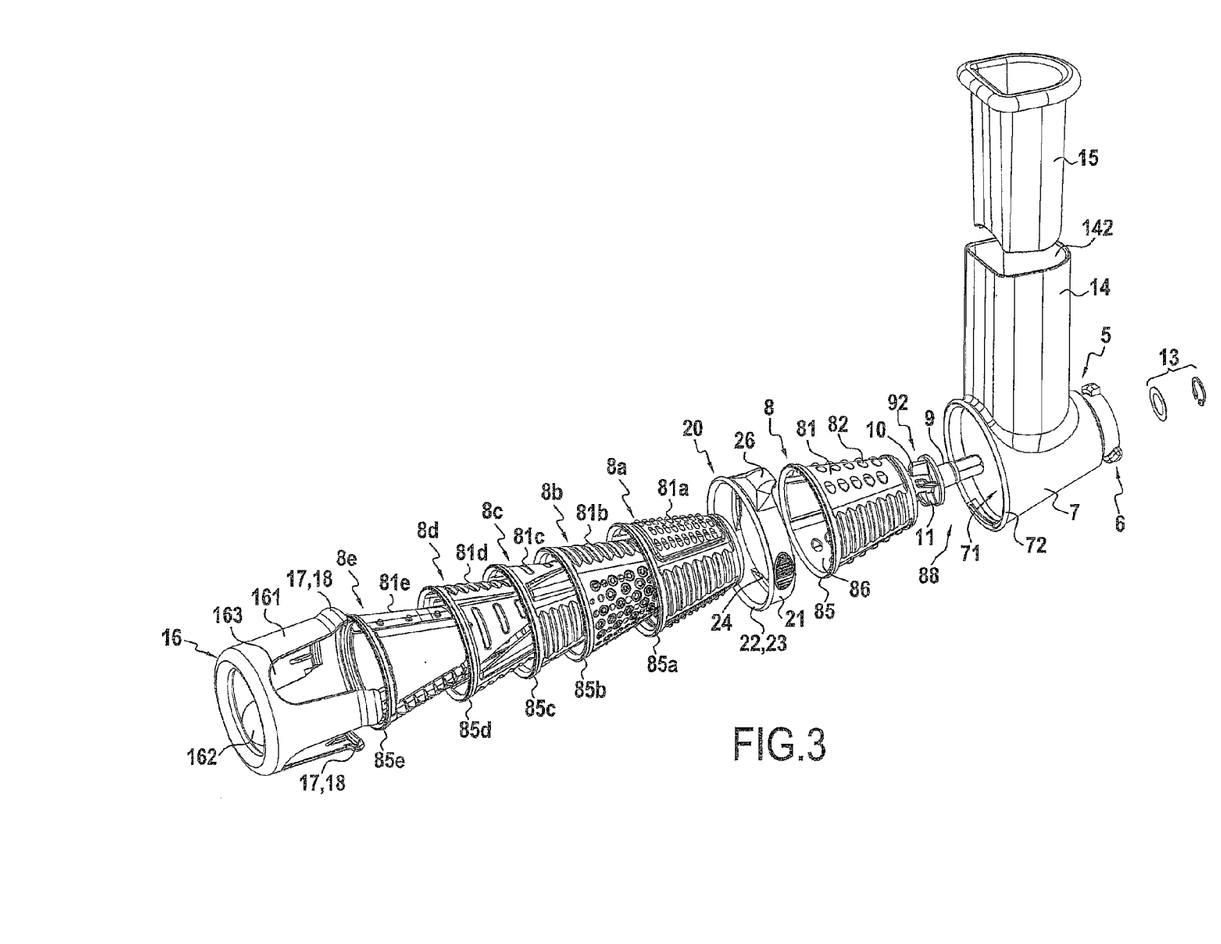
FIG. 3 is a blow up of the entire functional unit shown in FIG. 2.

Cutting accessory 5 is attached on case 3, shown in detail in FIGS. 2 and 3, and is preferably removable from case 3, and able to be attached on it with attachment ring 6, in particular using screws or sockets. Cutting accessory 5 contains storage compartment 7 which contains internal housing 71 the size and shape of which can be adjusted to receive and secure cutting tool 8, which is shaped like a truncated cone.

Cutting tool 8 contains body 81 shaped like a truncated cone which has a cutting mechanism on truncated cone wall 82. Body 81 has one extremity 83 which has at least one connecting and rotating drive mechanism. This connecting and rotating drive mechanism could be completed as shown in FIG. 2 with a female drive orifice 12 formed in lower wall 84 of cutting tool 8. Second extremity 85 of body 81 is open and forms outgoing opening 86 for cut food. Body 81 of cutting tool 8 is preferably made of molded plastic on cutting mechanism 82 formed by one or more pieces of sheet metal. In a variation, cutting tool 8 may be made from stamped metal.

As shown more specifically in FIGS. 2 and 3, cutting tool 8 as previously described may be mounted to freely rotate in storage compartment 7 of cutting accessory 5 and may be used along drive axis 9. This drive axis 9 works with posterior extremity 91 with the electrical motor located in motorized base 2 and through anterior extremity 92 with cutting tool 8. The connection between cutting tool 8 and drive axis 9 is preferably made through male connecting body 10 with teeth 11 adjusted to mesh with female connecting orifice 12 located on bottom 84 of tool 8.

The coaxial nature and relative positioning of drive axis 9 to storage compartment 7 and cutting tool 8 are provided by locking disk 13 threaded on drive axis 9 using its posterior extremity 91 and butts against the bottom of storage compartment 7 which accepts cutting tool 8.

Cutting accessory 5 also contains shaft 14 to insert the food to be cut. Shaft 14 is an integral part of storage compartment 7. Shaft 14 is formed by a tubular section opening at both ends which form access well 141 to the interior of storage compartment 7 and insertion orifice 142 to insert the food to be cut through shaft 14, respectively. This shaft 14 accepts pushing element 15 designed to push the food to be cut into shaft 14 through insertion orifice 142 into well 141 to allow the food to be cut using cutting tool 8 which rotates on drive axis 9 and the electrical motor inside motorized base 2 of appliance 1 when the user presses control switch 4.

As shown in FIGS. 1 to 3, household electrical appliance 1 of the invention contains a set of cutting tools 8, 8a, 8b, 8c, 8d, 8e.

Cutting tools 8, 8a, 8b, 8c, 8d, 8e each include cutting mechanisms 82, 82a, 82b, 82c, 82d, 82e and bodies 81, 81a, 81b, 81c, 81d, 81e shaped like a truncated cone designed to allow storage by nesting and stacking tools 8, 8a, 8b, 8c, 8d, 8e within one another, including in housing 71 in storage compartment 7 of cutting accessory 5 of the appliance. Accordingly, the various cutting tools 8, 8a, 8b, 8c, 8d, 8e are shaped to allow nesting within one another to create a tool stack. In the illustrated preferred embodiment, cutting tools 8, 8a, 8b, 8c, 8d, 8e are identical in size.

When household electrical appliance 1 is not being used, cutting tools 8, 8a, 8b, 8c, 8d, 8e may be stored as described in EP 2 159 014 by nesting said tools 8, 8a, 8b, 8c, 8d, 8e within one another in storage compartment 7 along a stacking axis which is also the rotation axis of drive axis 9 when rotating tool 8 to cut food. Once nested within one another, tools 8, 8a, 8b, 8c, 8d, 8e are then secured in position by locking hood 16 which contains locking mechanisms 17 on cutting accessory 5, and, more particularly, preferably on anterior edge 72 of storage compartment 7 thereof.

Locking hood 16 is shaped to mesh with the contours of cutting tools 8, 8a, 8b, 8c, 8d, 8e stacked within one another.

Locking hood 16 is adequately shaped to prevent cutting tools 8, 8a, 8b, 8c, 8d, 8e from shifting or moving relative to one another once blocked by locking mechanisms 17 on accessory 5.

As shown in particular in FIGS. 1 to 3, locking mechanisms 17 of locking hood 16 may be formed particularly in the simplest manner by hooks 18 designed to block hood 16 by clipping or hooking onto anterior circular edge 72 of storage compartment 7 of accessory 5. Such hooks 18 may be located, as shown in the figures, at the end of fasteners 161 of locking hood 16, which is attached to support tray 162 which engages with cutting tool 8e at the end of the tool stack in storage compartment 7. Of course, other types of locking mechanisms 17 may certainly be considered without falling outside the scope of this invention, in particular, locking mechanisms using screws or sockets. As showed in FIG. 1, fasteners 161 equipping openings 163 allowing some of cutting tools 8, 8a, 8b, 8c, 8d, 8e stored in locking hood 16 in place on accessory 5 to be viewed. Fasteners 161 also facilitate the installation and removal of locking hood 16. Fasteners 161 are designed to interact with anterior edge 72 of storage compartment 7.

Locking hood 16 may be made from molded plastic, although this type of embodiment is not the only one.

Therefore, locking hood 16 holds cutting tools 8, 8a, 8b, 8c, 8d, 8e in a stacked storage position in storage compartment 7 of household electrical appliance 1 when it is not in use.

However, when household electrical appliance 1 is in use, one of the six cutting tools 8, 8a, 8b, 8c, 8d, 8e is used and mounted in storage compartment 7 of accessory 5, and the five remaining cutting tools as well as locking hood 16 must be placed loosely alongside household electrical appliance 1, or stacked within one another in the inverted locking hood 16, with the risk of being accidently turned over.

To address this problem when storing of cutting tools 8, 8a, 8b, 8c, 8d, 8e when household electrical appliance 1 is being used or to facilitate alternative storing of cutting tools 8, 8a, 8b, 8c, 8d, 8e outside of household electrical appliance 1, this invention proposes storage mechanism 19 for a set of cutting tools 8, 8a, 8b, 8c, 8d, 8e consisting of locking hood 16 and securing ring 20 which works with locking hood 16 and is attached to it, for example, as shown in FIGS. 1 and 2.

In the example shown, storage mechanism 19 is provided to house five cutting tools 8, 8a, 8b, 8c, 8d, 8e while a sixth cutting tool is mounted in storage compartment 7 of household electrical appliance 1.

Figure 4A:
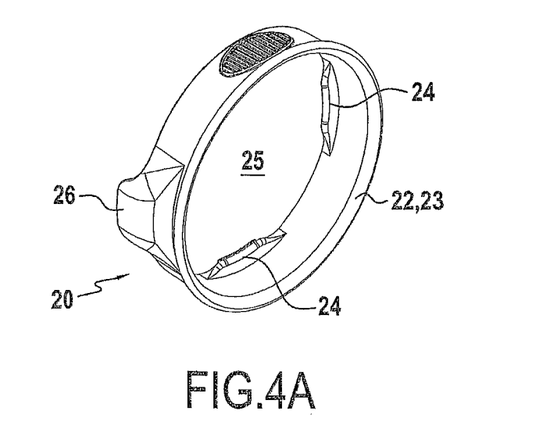
FIGS. 4A to 4C show various views of the storage mechanism securing ring of the invention in a preferred embodiment.
Figure 4B:
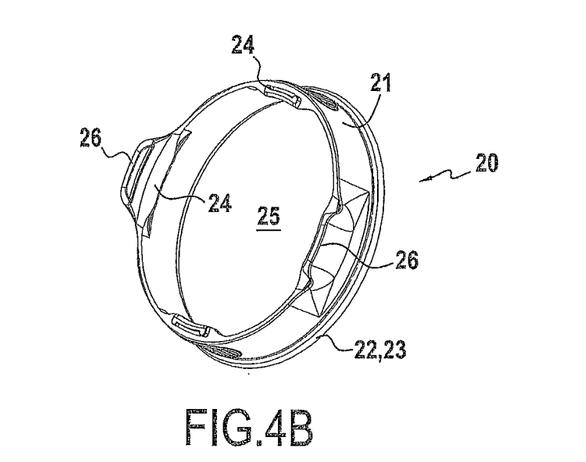
Figure 4C:
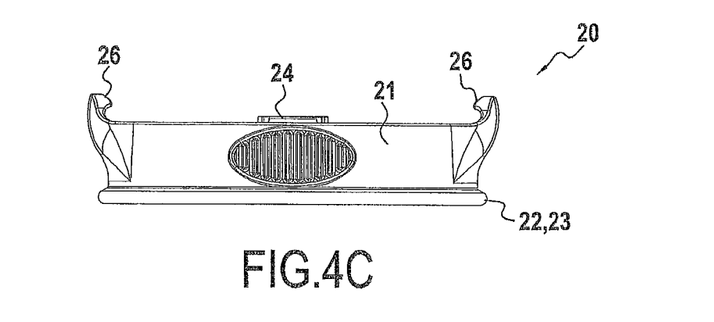

Various views of securing ring 20 are shown in FIGS. 4A to 4C. It consists of ring-shaped body 21, which has on its external ring-shaped wall, at the level of a peripheral side 22, an additional locking element of locking mechanism 17 in form of hooks 18 of locking hood 16 in the shape of protruding lip or edge 23, which is preferably almost identical to anterior edge 72 of storage compartment 7 of accessory 5 of household electrical appliance 1 to fix and block locking hood 16 using its hooks 18 on edge 23 of ring 20.

In the example shown, edge 23 is a continuous edge along the entire periphery of ring-shaped body 21 of ring 20. However, this edge may also be discontinuous (not shown), in particular, in the shape of protruding sections at regular intervals (not shown) on the periphery of ring-shaped body 21 of the ring, again to fix and block locking hood 16 using its hooks 18, either through elastic deformation and clipping on the edge, or by using a locking effect by rotating locking hood 16 on edge 23 of ring 20.

Of course, it is possible to create additional locking mechanisms 17, 23 of locking hood 16 and securing ring 20 in an alternative form such as, for example, in the form of locking mechanisms using screws or sockets. Nevertheless, such mechanisms are more complex and, therefore, more costly to implement.

Ring 20 preferably constitutes a collar to hold cutting tools 8, 8*a*, 8*b*, 8*c*, 8*d*, 8*e* in locking hood 16 to form storage mechanism 19 for cutting tools 8, 8*a*, 8*b*, 8*c*, 8*d*, 8*e*. To do so, it also contains, on the internal wall of ring-shaped body 21 at least one, and preferably two, stops 24 which project radially into the internal wall of ring-shaped body 21 to locally reduce the diameter of central opening 25 attached to the center of ring-shaped body 21 of ring 20 to allow partial passage of bodies 81*a*, 81*b*, 81*c*, 81*d*, 81*e* of cutting tools 8, 8*a*, 8*b*, 8*c*, 8*d*, 8*e* while completely blocking the passage of said cutting tools 8, 8*a*, 8*b*, 8*c*, 8*d*, 8*e* at the level of its wider second extremities 85, 85*a*, 85*b*, 85*c*, 85*d*, 85*e*.

Figure 5:
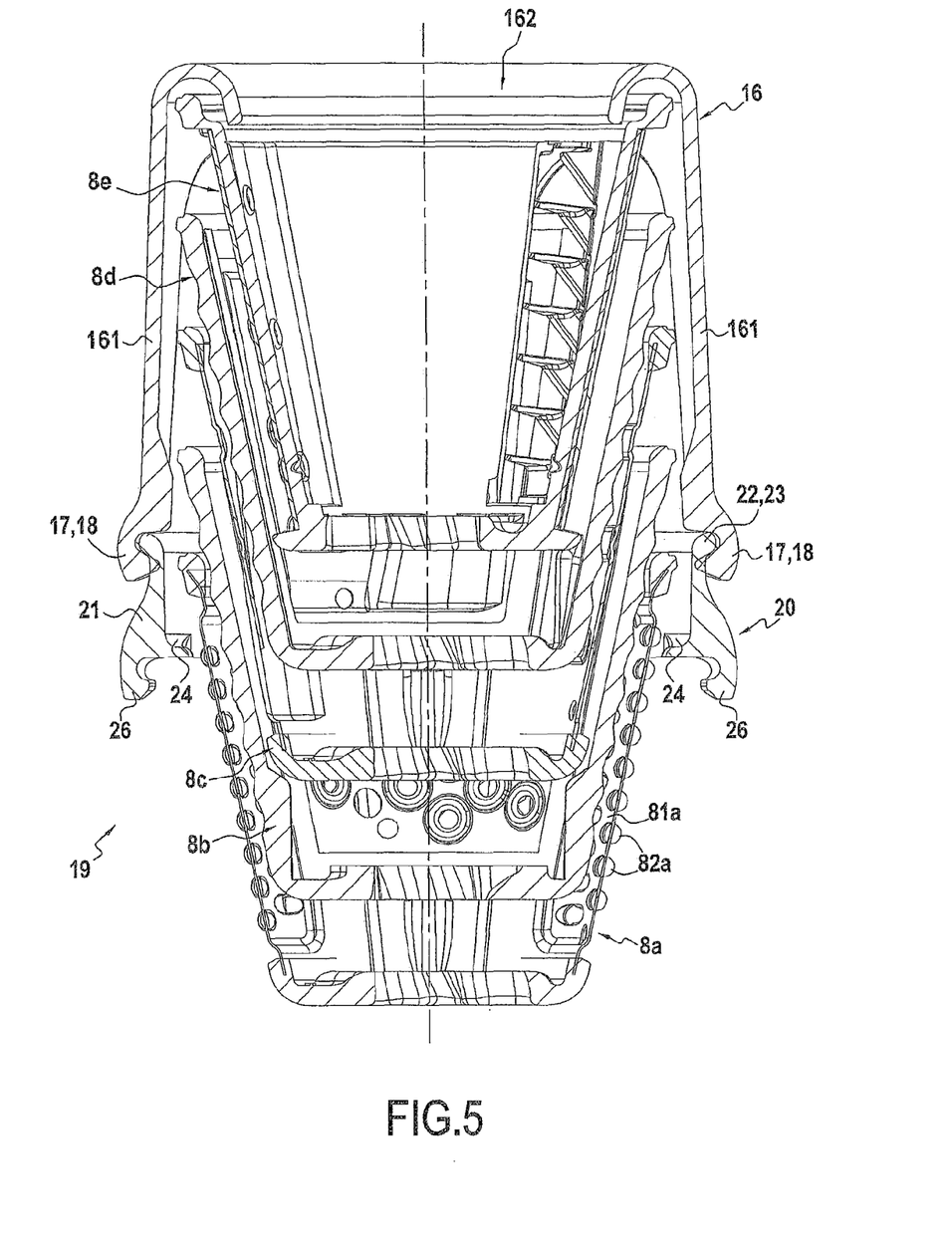
FIG. 5 shows the storage mechanism of the invention with a set of five cutting tools shaped like truncated cones.

Therefore, to store a set of five cutting tools 8*a*, 8*b*, 8*c*, 8*d*, 8*e* in storage mechanism 19, it is sufficient initially to, as shown in FIG. 5, nest cutting tools 8*a*, 8*b*, 8*c*, 8*d*, 8*e* within one another in locking hood 16, then to move ring 20 using its central opening 25 onto the resulting stack of cutting tools 8*a*, 8*b*, 8*c*, 8*d*, 8*e* and push it until its protruding peripheral edge 23 clicks on hooks 18 of fasteners 161 of locking hood 16. Once ring 20 and locking hood 16 are attached to one another by their additional attachment mechanism, stops 24 of ring 20 then rest against second extremity 85 of the last cutting tool 8 of the stack, thereby holding the cutting tools between locking hood 16 and ring 20 allowing them to be stored and moved individually and uniformly. Storage mechanism 19 containing the set of cutting tools 8*a*, 8*b*, 8*c*, 8*d*, 8*e* may thus be easily stored in a drawer or cupboard without risk that the tools will separate from one another.

In addition, storage mechanism 19 proposed by the invention may also be attached to household electrical appliance 1, preferably and in particular at the level of rim 72 of storage compartment 7 of accessory 5. To do so, ring 20 preferably contains, on the external wall of its ring-shaped body 21, at least two hooks 26, similar to hooks 18 of locking hood 16 which allows storage mechanism 19 to be clipped to rim 72 of accessory 5 as shown in FIGS. 1 and 2.

Of course, the hooks of attachment 25 could be replaced by any similar attachment mechanism on household electrical appliance 1, e.g., using screws or sockets.

It is easily possible to attach storage mechanism 19 on household electrical appliance 1 which would allow cutting tools 8, 8*a*, 8*b*, 8*c*, 8*d*, 8*e* to be placed directly on the household electrical appliance as with locking hood 16 used alone.

Figure 6:
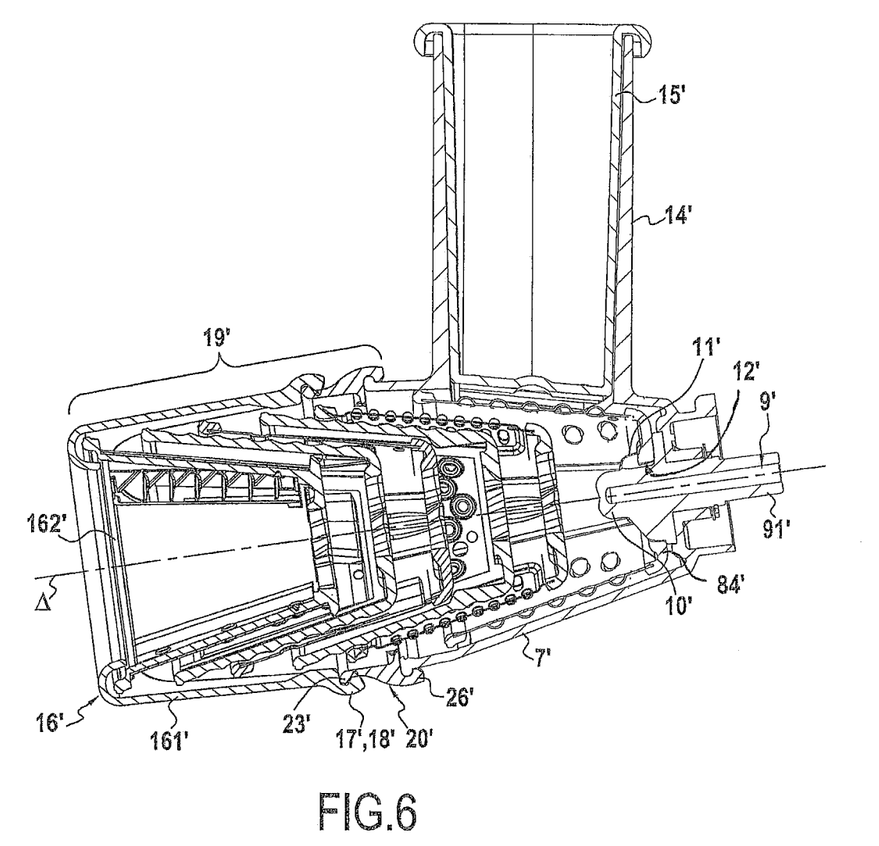
FIG. 6 shows in a view similar to that in FIG. 2 a variation in the embodiment of the household electrical appliance accessory of the invention which works with the invention storage mechanism and a set of cutting tools stored in said mechanism.

FIG. 6 shows a slight variation of the household electrical appliance in which storage compartment 7' is longer than storage compartment 7 of the device shown in FIGS. 1 to 5 and, in practice, extends beyond the edge of the rotating tool mounted in storage compartment 7' to better channel the exit of cut food.

In this embodiment, the remainder of the appliance is identical to that described in FIGS. 1 to 5 and, in particular, FIG. 2; in FIG. 6, the numerical references are identical to those in FIG. 2, but are marked with a prime character. Accordingly, the appliance is equipped with ring 20' identical to ring 20 and may be mounted on the edge of storage compartment 7' which is longer than storage compartment 7 in FIG. 2. Further, hood 16' is preferably slightly shorter than hood 16. However, ring 20' with hood 16' holds five rotating tools as shown in FIG. 2.

In another variation, hood 16, 16', which stores tools 8, 8*a*, 8*b*, 8*c*, 8*d*, 8*e* and contains locking mechanisms 17, 17' on household electrical appliance 1, is not necessarily mounted on storage compartment 7, 7'.

The method of storing tools in the shape of truncated cones proposed by the invention does not noticeably increase the general cluttering by household electrical appliance 1, which may still be easily stored in, for example, a cupboard. Cutting tools 8, 8*a*, 8*b*, 8*c*, 8*d*, 8*e* are stored economically and simply using storage mechanism 19, 19' of the invention, which is integrated very easily into the appliance itself or which may be detached to separately store cutting tools 8, 8*a*, 8*b*, 8*c*, 8*d*, 8*e*. Accordingly, it is possible for the user to always have cutting tools 8, 8*a*, 8*b*, 8*c*, 8*d*, 8*e* available.

The use of household electrical appliance 1 of the invention and its storage ability is very intuitive. When the user wishes to prepare a dish which requires grated or minced vegetables, for example, it is sufficient to remove appliance 1 from its storage area and place its motorized base 2 on a stable workplace. The user then selects cutting tool 8, 8*a*, 8*b*, 8*c*, 8*d*, 8*e* which is best suited to the desired preparation. Once the correct tool 8 has been selected, the user mounts it directly in storage compartment 7, 7' making sure that said tool 8 is solidly connected by its connecting orifice with the connecting male body of drive axis 9, 9' connected to the motor in motorized base 2. It is sufficient to then connect appliance 1 to the electrical grid using the plug, insert the food to be cut into shaft 14, 14' and start the appliance by pushing on switch 4. Tool 8 mounted in storage compartment 7, 7' then rotates due to the action of drive axis 9, 9' and the motor and the food in shaft 14, 14', pushed if necessary by the user using pushing element 15, 15', are grated and/or minced by tool 8 and emptied through the orifice of anterior extremity 83 onto a tray or plate.

Once the food has been prepared, the user stops appliance 1, unplugs it, and then removes tool 8 from the interior of storage compartment 7, 7' for cleaning, and, if appropriate, also cleans accessory 5 if it is removable. When these items have been cleaned, it is sufficient to again store the set of tools 8, 8*a*, 8*b*, 8*c*, 8*d*, 8*e* in storage mechanism 19, 19' by stacking them within one another, then securing this tool stack in place using securing ring 20, 20' placed on tool stack 8, 8*a*, 8*b*, 8*c*, 8*d*, 8*e* and clipping them using the hooks 18, 18' of locking hood 16, 16' on edge 23, 23' of securing ring 20, 20'. The user then places storage mechanism 19, 19' in a cupboard, drawer or attaches it to rim 72 of storage compartment 7 of accessory 5 of household electrical appliance 1.

In the specific example shown, which is the preferred manner, cutting tools 8, 8*a*, 8*b*, 8*c*, 8*d*, 8*e* are in the shape of truncated cones which makes stacking easy and compact and ensures effective food cutting. However, it should be noted that the compactness of the stacking depends both on the angle of the cone and the thickness of the tool wall.

The following benefits of the solution for storing tools are provided by the invention:

the tools are all arranged compactly and securely without requiring a container or additional storage space in the household electrical appliance;

minimum cluttering from the stacked tools;

storage is arranged on an accessible and visible portion of the appliance, which allows the tools to always be available; and finally, this storage solution is simple and extremely inexpensive.

The invention claimed is:

1. Storage mechanism for storing nesting cutting tools, comprising a hood to house and at least partially cover at least some of said cutting tools nested within one another, wherein the hood includes locking mechanisms for locking the hood on a household electrical appliance for preparing food, characterized in that the storage mechanism comprises a securing ring for securing the nested cutting tools in the hood, the securing ring having complementary locking mechanisms with the locking mechanisms of the hood being designed to mate with the complementary locking mechanisms of said securing ring, said securing ring also comprising at least one locking stop for locking said nested cutting tools relative to said ring which holds said tools at least partially inside the hood.

2. Storage mechanism based on claim 1, wherein securing ring comprises a ring-shaped body on an external wall of which are formed said complementary locking mechanisms complementary to the locking mechanisms of the hood, and on an internal wall of which is formed the at least one locking stop for locking the cutting tools.

3. Storage mechanism based on claim 1, wherein the locking mechanisms of the hood on the securing ring are selected from one of the following categories: clip-on, screwed or socketed locking mechanisms.

4. Storage mechanism based on claim 1, wherein the locking mechanisms of the securing ring of the storage mechanism of the invention include at least one continuous strip protruding onto the external wall of the securing ring or multiple protruding sections uniformly spread on the external wall.

5. Storage mechanism based on claim 1, wherein said securing ring of the storage mechanism also contains attachment elements on a household electrical appliance for preparing food.

6. Storage mechanism based on claim 1, wherein the hood is shaped to fit the contours of the cutting tools stacked within one another.

7. Storage mechanism based on claim 1, wherein the cutting tools are identical in size.

8. Storage mechanism based on claim 1, wherein the hood has at least one opening through which at least some of the cutting tools housed in the locking hood in place on an accessory can be seen.

9. Household electrical appliance for preparing food, having a motorized base comprising a case enclosing an electrical motor and electrical controls for said motor, an accessory which is affixed to the motorized base and which comprises a storage compartment for holding cutting tools, wherein a set of said cutting tools are shaped to allow them to nest within one another in order to be stacked in the storage compartment of the accessory, connecting and drive mechanisms to rotate one of said cutting tools mounted in the accessory storage compartment, a locking hood for said cutting tools stacked within one another in the accessory storage compartment, wherein the household electrical appliance also comprises a storage mechanism according to claim 1 for storing the nested cutting tools.

10. Household electrical appliance based on claim 9, wherein the securing ring of the storage mechanism comprises mechanisms to fix the storage mechanism on the accessory of the household electrical appliance for preparing food.

11. Household electrical appliance based on claim 9, wherein the motorized base consists of the case enclosing the electrical motor and the electrical controls for said motor.

12. Household electrical appliance based on claim 9, wherein the securing ring of the storage mechanism comprises mechanisms to fix the storage mechanism on the household electrical appliance for preparing food.

13. Household electrical appliance based on claim 9, wherein the locking mechanisms for locking the hood on the accessory and/or on the securing ring are selected from one of the following categories: clipping, screwing or socket attachment mechanism.

14. Household electrical appliance based on claim 9, wherein the cutting tools present on a body shaped like a truncated cone, and wherein the storage compartment of the accessory creates a reception and storage housing in a shape which is complementary to that of said cutting tools.

15. Household electrical appliance based on claim 9, wherein the accessory is removable from the motorized base, and wherein said motorized base and said accessory each contain additional attachment mechanisms to be attached to one another.

16. Household electrical appliance based on claim 9, wherein the locking hood has fasteners designed to mate with an anterior edge of the storage compartment and/or with locking mechanisms on an external wall of the securing ring.

17. Household electrical appliance for preparing food, having a motorized base comprising a case enclosing an electrical motor and electrical controls for said motor, an accessory which is affixed to the motorized base and which comprises a storage compartment for holding cutting tools, wherein a set of said cutting tools are shaped to allow them to nest within one another in order to be stacked in the storage compartment of the accessory, connecting and drive mechanisms to rotate one of said cutting tools mounted in the accessory storage compartment, a locking hood for said cutting tools stacked within one another, wherein the household electrical appliance also comprises a storage mechanism according to claim 1 for storing the nested cutting tools.

18. Household electrical appliance based on claim 17, wherein the securing ring of the storage mechanism comprises mechanisms to fix the storage mechanism on the household electrical appliance for preparing food.

19. Household electrical appliance based on claim 17, wherein the securing ring of the storage mechanism comprises mechanisms to fix the storage mechanism on the accessory of the household electrical appliance for preparing food.

20. Household electrical appliance based on claim 17, wherein the motorized base consists of the case enclosing the electrical motor and the electrical controls for said motor.

21. Household electrical appliance based on claim 17, wherein the locking mechanisms for locking the hood on the accessory and/or on the securing ring are selected from one of the following categories: clipping, screwing or socket attachment mechanism.

22. Household electrical appliance based on claim 17, wherein the cutting tools present a body shaped like a truncated cone, and wherein the storage compartment of the accessory creates a reception and storage housing in a shape which is complementary to that of said cutting tools.

23. Household electrical appliance based on claim 17, wherein the accessory is removable from the motorized base, and wherein said motorized base and said accessory each contain additional attachment mechanisms to be attached to one another.

24. Household electrical appliance based on claim 17, wherein the locking hood has fasteners designed to mate with an anterior edge of the storage compartment and/or with locking mechanisms on an external wall of the securing ring.

* * * * *